(12) United States Patent
Komatsu et al.

(10) Patent No.: US 6,469,622 B1
(45) Date of Patent: Oct. 22, 2002

(54) AUTOMOBILE REAR COMBINATION LAMP

(75) Inventors: Takayuki Komatsu, Tochigai (JP); Tomoaki Seki, Toichigi (JP); Masayoshi Tajima, Utsunomiya (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/207,628

(22) Filed: Dec. 9, 1998

(30) Foreign Application Priority Data

Dec. 11, 1997 (JP) ............................................. 9-361659

(51) Int. Cl.[7] ................................................. B60Q 1/50
(52) U.S. Cl. ................... 340/464; 340/463; 340/815.41; 362/487; 362/496; 362/510; 362/546
(58) Field of Search ........................... 340/464, 815.41, 340/907, 908, 906, 475, 479, 463; 362/548, 455, 459, 517, 510, 546, 487, 496

(56) References Cited

U.S. PATENT DOCUMENTS

| | | | | |
|---|---|---|---|---|
| 4,081,667 A | * | 3/1978 | Lewin et al. | 362/296 |
| 4,680,678 A | * | 7/1987 | Iwaki | 362/61 |
| 4,962,450 A | * | 10/1990 | Reshetin | 362/268 |
| 5,001,610 A | * | 3/1991 | Otaka | 362/61 |
| 5,383,102 A | * | 1/1995 | Jones | 362/61 |
| 5,556,194 A | * | 9/1996 | Natsumet et al. | 362/299 |
| 5,939,979 A | * | 8/1999 | Lee | 340/479 |
| 5,954,427 A | * | 9/1999 | Campos et al. | 362/517 |
| 6,019,492 A | * | 2/2000 | Ikegaya et al. | 362/521 |
| 6,097,549 A | * | 8/2000 | Jenkins et al. | 359/726 |

FOREIGN PATENT DOCUMENTS

| | | | | |
|---|---|---|---|---|
| EP | 180 145 B1 | 5/1986 | | F21Q/1/00 |
| GB | 1 591 013 | 6/1981 | | B60Q/1/34 |

* cited by examiner

*Primary Examiner*—Daniel J. Wu
*Assistant Examiner*—Davetta W. Goins
(74) *Attorney, Agent, or Firm*—Morgan, Lewis & Bockius LLP

(57) ABSTRACT

An automobile lamp having a colorless and transparent light source, a housing whose front portion is an-aperture covered with a lens, wherein the housing has a color to be perceived as a uniform color of the automobile lamp when the light source is off, and reflecting portions arranged on the inner back surface of the housing such that they form a mesh or striped pattern when combined with the remaining portion of the inner back surface of the housing. Color uniformity of the automobile lamp when the automobile lamp is off is greatly improved. Furthermore, in spite of small proportion of the reflecting portions as compared with the conventional composition, the automobile lamp is able to emit light in sufficient quantity without any light source with high luminance accompanying high power consumption. There is also provided an automobile rear combination lamp having a turn signal lamp, a back-up lamp, and a stop lamp based on the automobile lamp disclosed herein.

59 Claims, 3 Drawing Sheets

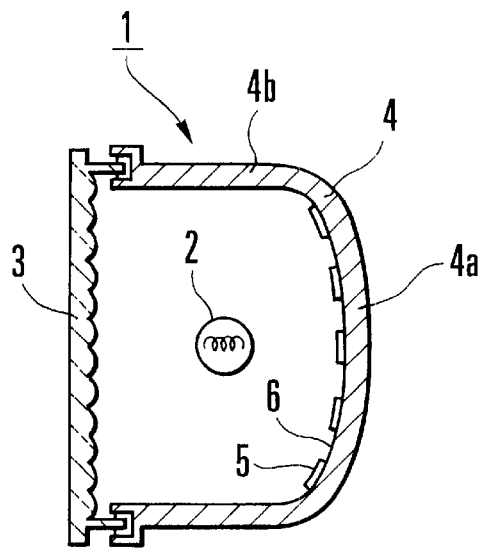
FIG.1
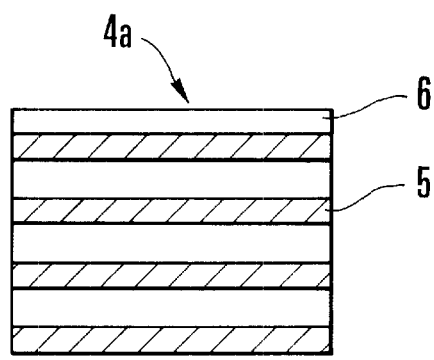
FIG.2 (a)
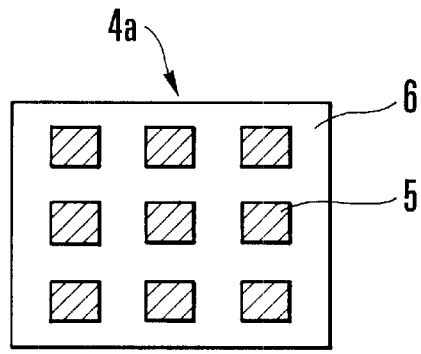
(b)
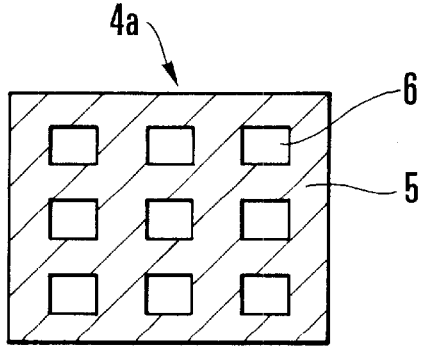
(c)

AUTOMOBILE REAR COMBINATION LAMP

This invention claims the benefit of Japanese Patent Application No. 09-361659, filed on Dec. 11, 1997, which is hereby incorporated by reference.

BACKGROUND OF THE INVENTION

The present invention relates to an automobile lamp used as a back-up lamp or a turn signal lamp and an automobile rear combination lamp including it, and more particularly to a composition and a method of producing the automobile rear combination lamp and the automobile lamp included therein having high color uniformity when it is turned off. The automobile rear combination lamp is comprised of a plurality of automobile lamps, and the color of each automobile lamp differs respectively depending on whether the lamp is turned on or off.

FIG. 7 illustrates a cross sectional view of an automobile lamp 50 of a conventional automobile rear combination lamp. The automobile lamp 50 comprises a housing 52 having an aperture on its front portion, an outer lens 53 covering the aperture of the housing 52, an inner lens 54, and a light source 51. The front surface of the inner lens 54 comprises one or more transparent window portion 56 and an opaque film portion 55, which combine to form a mesh or striped pattern. The back surface of the inner lens 54 has prismatic cuts such that the light emitted from the light source 51 passes mainly through the transparent window portions 56.

When the automobile lamp 50 is used as a back-up lamp, the automobile lamp 50 is required to emit white light. The outer lens 53 and the inner lens 54 are formed of colorless and transparent material. The opaque film portions 55 are typically red, or may be the same color as the automobile body or the bumper. When the light source 51 is turned off, the color of the opaque film portions 55 is perceived as the color of the automobile lamp 50. When the light source 51 is turned on, the color of the light passed through the window portions 56 is perceived as the color of the automobile lamp 50. When the automobile lamp 50 is used as a turn signal lamp, the inner lens 54 is formed of amber material, or the light source 51 may have an amber cap.

An automobile rear combination lamp is a combination of the automobile lamps. Since each automobile lamp 50 has one or more film portion 55 having a color that matches the automobile body, sufficient color uniformity is obtained when the automobile rear combination lamp is turned off, while each automobile lamp 50 performs its own function when it is turned on. When all the automobile lamps are turned off, the automobile rear combination lamp is perceived to have one uniform color in the front view from outside. When any automobile lamp 50 is turned on, the automobile lamp 50 respectively emits light having a predetermined color depending on its function.

The conventional automobile lamp 50 has the following problems. First, it is difficult to have an appropriate proportion between the opaque film portion 55 and the window portion 56 to satisfy both efficiency of the light emitted from the light source 51 and color uniformity of the automobile lamp 50 when the light source 51 is turned off. The opaque film portions 55 prohibit most of the light emitted from the light source 51 from passing through. In order to increase the efficiency of the emitted light from the light source 51, the area of the opaque film portions 55 must be reduced, such that the area of the window portions 56 must be increased. However, in this composition, since the opaque film portions 55 are disposed close to the outer lens 53 the color uniformity of the automobile lamp 50 decreases when the light source 51 is turned off such that the color of the automobile lamp 50 does not match the automobile body. Second, in order to obtain high color uniformity of the automobile lamp 50, the opaque film portions 55 must be enlarged. As a result, since the efficiency of the light emitted from the light source 51 decreases, it is required to use a light source having high luminance accompanying high power consumption.

SUMMARY OF THE INVENTION

The present invention is directed to an automobile rear combination lamp and an automobile lamp included therein that substantially obviates one or more of the above problems due to the limitations and disadvantages of the related art.

An object of the invention is to provide an automobile rear combination lamp and an automobile lamp included therein having high color uniformity when the light source is turned off, and improved power consumption efficiency.

Another object of the invention is to provide a method of producing an automobile rear combination lamp and automobile lamp included therein with the improved properties described above.

According to the present invention, the above objects are achieved by providing an automobile lamp comprising a colorless and transparent light source, a housing whose front portion is an aperture covered with a lens, wherein the housing has a color to be perceived as a color of the automobile lamp when the light source is turned off, and reflecting portions arranged on the inner back surface of the housing to form a mesh or stripe pattern when combined with the remaining portions of the inner back surface of the housing.

To achieve these and other advantages and in accordance with the purpose of the present invention, as embodied and broadly described, in accordance with a first aspect of the present invention there is provided an automobile lamp included in an automobile rear combination lamp having a light source, a housing whose front portion is an aperture, and a lens covering the aperture, where the automobile lamp further comprises an inner back surface of the housing having a color that is visible as a uniform color of the automobile lamp when the light source is off, and at least one reflecting portion disposed in a pattern on the inner back surface of the housing.

In another aspect of the present invention, there is provided an automobile lamp included in an automobile rear combination lamp having a light source, a housing whose front portion is an aperture, and a lens covering the aperture, the automobile lamp further comprising at least one concave and convex portions arranged in a predetermined pattern on an inner back surface of the housing, at least one reflecting portion disposed on the convex portion of the housing, and an inner wall having a color that is visible as a uniform color of the automobile lamp when the automobile lamp is off and being disposed entirely on an inner side surface and inner back surface of the housing, having at least one slit portion on the inner back surface of the housing in which the reflecting portion is disposed.

In a further aspect of the present invention, there is provided an automobile rear combination lamp comprising a turn signal lamp, a back-up lamp, and a stop lamp; wherein the turn signal lamp further includes a light source covered with an amber cap, a first housing with a first aperture, a first lens covering the first aperture, and at least one reflecting portion arranged partially in a pattern on an inner back surface of the first housing, the back-up lamp further includes a colorless and transparent light source, a second housing with a second aperture, a second lens covering the second aperture, and at least one reflecting portion arranged partially in a predetermined pattern on an inner back surface of the second housing, the stop lamp further includes a colorless and transparent light source, a third housing with a third aperture, a third lens covering the third aperture, and at least one reflecting portion arranged entirely on an inner back surface of the third housing, wherein the first lens, second lens, and third lens are composed of two or more predetermined colors such that emitted light from the turn signal lamp, the back-up lamp, and the stop lamp have a color depending on the function of the lamp, and an inner side surface and the inner back surface of the housing corresponding to the turn signal lamp, the back-up lamp, and the stop lamp have a color to be perceived as a color of the automobile rear combination lamp when the lamp is off.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 1 illustrates a cross sectional view of the first preferred embodiment of the present invention.

FIG. 2(a) illustrates a front view of the reflecting portion in the first pattern formed on the inner back surface of the housing of the first preferred embodiment of the present invention.

FIG. 2(b) illustrates a front view of the reflecting portion in the second pattern formed on the inner back surface of the housing of the first preferred embodiment of the present invention.

FIG. 2(c) illustrates a front view of the reflecting portion in the third pattern formed on the inner back surface of the housing of the first preferred embodiment of the present invention.

DETAILED DESCRIPTION OF THE PREFERRED EMBODIMENTS

Figure 3:
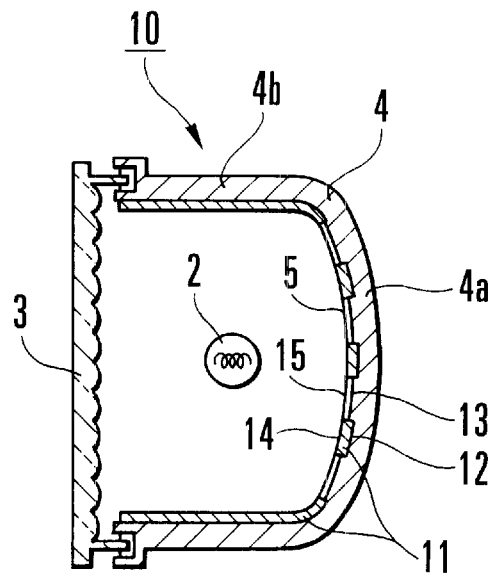
FIG. 3 illustrates a cross sectional view of the second preferred embodiment of the present invention.

Reference will now be made in detail to the present preferred embodiments of the invention. Whenever possible, the same references numbers will be used throughout the drawings to refer to the same or like parts.

FIG. 1 illustrates a first preferred embodiment of the present invention used as a back-up lamp included in an automobile rear combination lamp. The automobile lamp 1 comprises a colorless and transparent light source 2, a housing 4 whose front portion is an aperture, an inner back surface 4a of the housing 4, reflecting portions 5 arranged in a predetermined pattern on the inner back surface 4a, remaining portions 6 on the inner back surface 4a, and a lens 3 covering the aperture of the housing 4. The housing 4 is formed of a red opaque material. Red is a required color for automobile design when the light source 2 is turned off. The light source 2 emits colorless and transparent light. The lens 3 is colored such that the transparent and colorless light emitted from the light source 2 is to be white satisfying JIS D 5500 and JIS Z 8701 restrictions when it passes through the lens 3. The color of the lens 3 is typically white in a close range to the red color limit. The lens 3 may be pale pink.

FIGS. 2(a)–(c) illustrate some patterns of the reflecting portions 5 formed on the inner back surface 4a. The housing 4 is formed of red opaque material. The reflecting portions 5 are formed through aluminum evaporation, silver painting, or the like. Any element of the reflecting portions 5 is arranged to be a predetermined distance from an adjacent element, respectively, such that the reflecting portions 5 and the remaining portions 6 combine to be mesh or stripe patterns as depicted in FIGS. 2(a)–(c), respectively.

Other patterns of the reflecting portions 5 are possible provided that the reflecting portions 5 reflect light emitted from the light source 2 towards the lens 3 in a predetermined quantity and have a predetermined proportion relative to the remaining portions 6.

The color of the inner back surface 4a of the housing 4 is not limited to red. Any color is possible provided that it matches the automobile body or bumper.

The reflecting patterns 5 may be reflecting mirrors arranged on or close to the inner back surface 4a.

The operational advantages of the automobile lamp 1 according to the preferred embodiment of the present invention will now be described. More flexible automobile color design is possible by arranging the automobile lamp 1 to have a color in a wider range that matches the automobile body when the light source 2 is turned off. When the light source 2 is turned off, the reflecting portions 5 reflect the color of the remaining portions 6, and the red color comprising the reflecting portions 5 and the remaining portions 6 is perceived as the color of the automobile lamp 1 viewed from the front. On the other hand, when the light source 2 is turned on colorless light from the light source 2 and the reflected light reflected on the reflecting portions 5 is emitted from the automobile lamp 1. Thus, the color of the automobile lamp 1 differs depending on whether the light source 2 is turned on or off.

In spite of the small proportion of the reflecting portions 5 relative to the remaining portions 6, as compared with the conventional composition in which the inner back surface 58 is entirely a reflector, the automobile lamp 1 is able to emit light in sufficient quantity without any light source with high luminance accompanying high power consumption. Since the reflecting portions 5 reflect the color of the remaining portions 6 when the light source 2 is turned off, the automobile lamp 1 has sufficient color uniformity viewed from the front. Accordingly, it is possible to reduce the area of the remaining portions 6 and to improve the efficiency of the emitted light from the light source 2.

Figure 5:
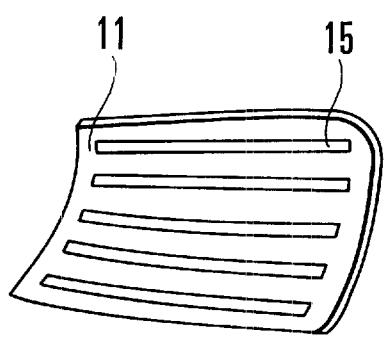
FIG. 5 illustrates an inner back wall disposed on the inner back surface of the housing of the second preferred embodiment of the present invention.

FIG. 3 illustrates a second preferred embodiment of the present invention used as a back-up lamp included in an automobile rear combination lamp. The automobile lamp 10 includes a light source 2, a housing 4 whose front portion is an aperture, and a lens 3 covering the aperture of the housing 4. In this embodiment, the housing 4 has an inner wall 11 disposed on the inner back surface 4a and the inner side surface 4b of the housing 4. The inner wall 11 has a color perceived as a color of the automobile lamp 10 when the light source 2 is turned off. The inner back surface 4a has concave portions 12 and convex portions 13. Reflecting portions 5 are arranged on the convex portions 13. The inner wall 11 has slit portions 15 around the portion corresponding to the inner back surface 4a, as depicted in FIG. 5. The convex portions 13 on which the reflecting portions 5 are formed are disposed in the slit portions 15, respectively. The reflecting portions 5 are formed through aluminum evaporation, silver painting, or the like. The inner wall 11 is formed of a red material like polycarbonate, or a red material is painted on the surface of the raw inner wall material. It is preferable to form the inner wall 11 of a red material, since a painting process is not required and the color does not fade easily. The slit portions 15 and the inner wall 11 are formed together through multi-injection molding at the same step in the production processes. The slit portions 15 may be formed through punching after the formation of the inner wall 11.

This composition greatly improves the production efficiency of the automobile lamp 10. Since the reflecting portions 5 and the inner wall 11 are formed separately, troublesome processes such as masking are not required.

Figure 4:
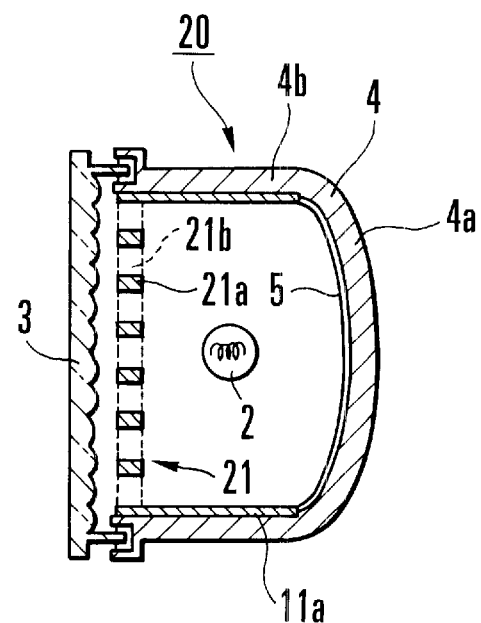
FIG. 4 is a cross sectional view of the third preferred embodiment of the present invention.

FIG. 4 illustrates a third preferred embodiment of the present invention used as a back-up lamp included in an automobile rear combination lamp. In this embodiment, a reflecting portion 5 is arranged on the inner back surface 4a entirely, and an inner front wall 21 is disposed between the light source 2 and the lens 3. The inner front wall 21 comprises opaque colored portions 21a and window portions 21b through which the light emitted from the light source 2 passes towards the lens 3. The opaque colored portions 21a and the window portions 21b combine to be mesh or stripe patterns as depicted in FIGS. 2(a)–(b). The side inner wall 11a and the opaque colored portions 21a are formed of a red opaque material. It is preferable to form the inner front lens 21 and the side inner wall 11a through multi-injection molding at the same step in the production process.

This embodiment may further comprise an inner back wall arranged to cover partially the inner back surface 4a, not illustrated herein, to obtain further improved color uniformity when the light source 2 is turned off. The inner back wall may be formed from a different material from the side inner wall 11a. However, it is preferable to use the same material for production efficiency.

Any composition of the above embodiments may be used as a turn signal lamp as well as a back-up lamp. When it is used as a turn signal lamp, a light source emitting amber light is used, and a white inner surface of the housing and/or a white inner wall may be adopted.

Figure 6:
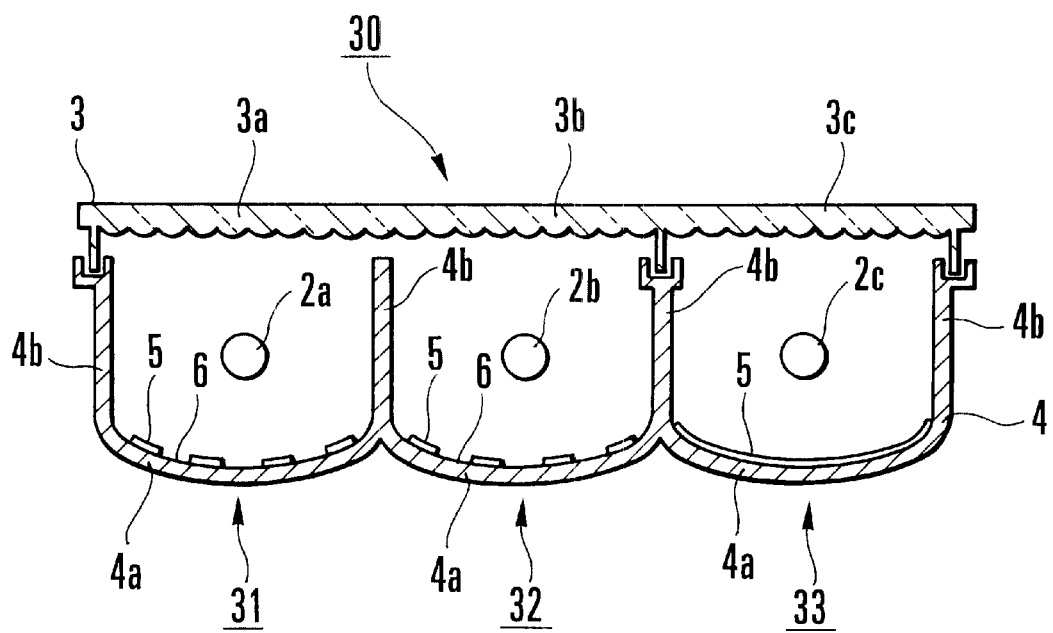
FIG. 6 illustrates a cross sectional view of the fourth preferred embodiment of the present invention.
Figure 7:
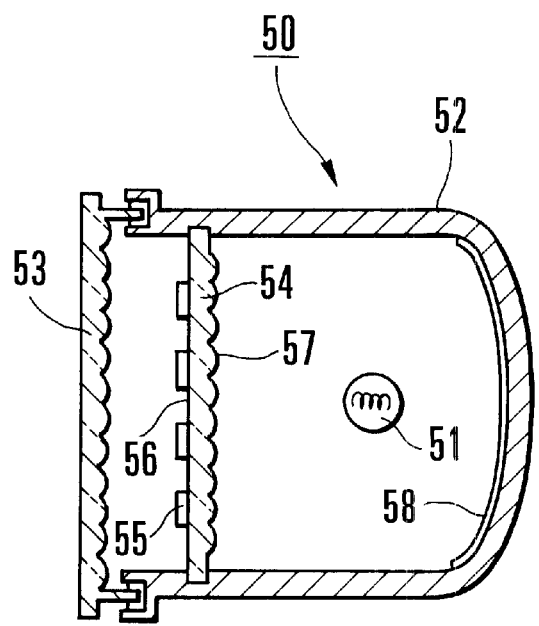
FIG. 7 is a cross sectional view of the conventional automobile lamp included in a conventional automobile rear combination lamp.

FIG. 6 illustrates a fourth preferred embodiment of the present invention. The automobile rear combination lamp 30 is based on the composition of the automobile lamp 1. The rear combination lamp 30 comprises a turn signal lamp 31, a back-up lamp 32, and a stop lamp 33. The lens 3 and the housing 4 are respectively shared partially by adjacent combination lamp elements.

In the turn signal lamp 31, a light source 2a is covered with an amber cap. The light source 2a may be formed of glass including amber pigment. In the back-up lamp 32, the light source 2b is colorless and transparent. In the stop lamp 33, the light source 2c is colorless and transparent. The turn signal lamp 31, the back-up lamp 32 and the stop lamp 33 have a red inner back surface 4a and a red inner side surface 4b in the housing 4.

In the turn signal lamp 31 and the back-up lamp 32, the reflecting portions 5 are arranged partially in a predetermined pattern on the inner back surface 4a, and each element of the reflecting portions 5 has a predetermined distance to the adjacent element. In the stop lamp 33, the reflecting portion 5 is arranged entirely on the inner back surface 4a.

In the turn signal lamp 31 and the back-up lamp 32, the light sources 2a and 2b, if the light source 2a is not covered with the amber cap, respectively emit colorless and transparent light. The lenses 3a and 3b are colored such that the transparent and colorless light emitted from the light sources 2a and 2b is to be white satisfying JIS D 5500 and JIS Z 8701 restrictions when it passes through the lenses 3a and 3b, respectively. The color of the lenses 3a and 3b is white in a close range to the red color limit.

The lenses 3a and 3b may be a pale pink color provided that the color satisfies the restriction on the color range. In the illustrated stop lamp 33, the lens 3c is red. When the light source 2a is turned on, the turn signal lamp 31 emits amber light. When the light source 2b is turned on, the back-up lamp 32 emits colorless light, and when the light source 2c is turned on, the stop lamp 33 emits red light. The automobile rear combination lamp 30 has high color uniformity when the light sources 2a, 2b, and 2c are turned off together or respectively. When any light source 2a, 2b or 2c is turned on, the automobile lamp emits light having a predetermined color depending on its own function.

Regarding the formation of the automobile rear combination lamp 30, the lenses 3a, 3b, 3c, and the housing 4 of each automobile lamp 31, 32, 33 are preferably formed through multi color injection molding at the same step in the production processes.

The automobile rear combination lamp 30 may be based on the composition of the automobile lamp 10 or 20, not illustrated herein.

It will be apparent to those skilled in the art that various changes and modifications can be made therein without departing from the spirit and scope thereof Thus, it is intended that the present invention cover the modifications and variations of this invention provided they come within the scope of the appended claims and their equivalents.

What is claimed is:

1. An automobile lamp included in an automobile rear combination lamp having a light source, a housing whose front portion is an aperture, and a lens covering the aperture, the automobile lamp further comprising:

an inner back surface of the housing having a color that is visible-as a uniform color of the automobile lamp when the light source is off; and at least one reflecting portion disposed in a pattern on the inner back surface of the housing such that light dispersed by the reflecting portion causes a substantially uniform color appearance at the front of the housing.

2. The apparatus according to claim 1, wherein the reflecting portion is disposed in a mesh pattern on the inner back surface of the housing.

3. The apparatus according to claim 1, reflecting portion is disposed in a striped pattern on the inner back surface of the housing.

4. The apparatus according to claim 1, wherein the light source has a color depending on a function of the automobile lamp.

5. The apparatus according to claim 1, wherein the light source has a cap having a color depending on a function of the automobile lamp.

6. The apparatus according to claim 1, wherein the light source comprises a bulb formed of glass including a pigment having a color depending on a function of the automobile lamp.

7. The apparatus according to claim 1, wherein the automobile lamp is formed within an automobile body having a color, and wherein the automobile lamp inner back surface color is similar to the automobile body color.

8. The apparatus according to claim 1, wherein the automobile lamp is formed adjacent to an automobile bumper having a color, and wherein the automobile lamp inner back surface color is similar to the automobile bumper color.

9. The apparatus according to claim 1, wherein the lens is colored such that emitted light from the light source has a color when it passes through the lens depending on a function of the automobile lamp.

10. The apparatus according to claim 1, wherein when the light emitted from the automobile lamp is white, a color of the lens is white in a close range to the color limit of the color of the automobile body.

11. The apparatus according to claim 1, wherein when the light emitted from the automobile lamp is white, a color of the lens is white in a close range to the color limit of the color of the bumper.

12. An automobile lamp included in an automobile rear combination lamp having a light source, a housing whose front portion is an aperture, and a lens covering the aperture, the automobile lamp further comprising:
   at least one concave portion and convex portion arranged in a predetermined pattern on an inner back surface of the housing;
   at least one reflecting portion disposed on the convex portion of the housing such that light dispersed by the reflecting portion causes a substantially uniform color appearance at the front of the housing; and
   an inner wall having a color that is visible as the uniform color of the automobile lamp when the automobile lamp is off and being disposed entirely on an inner side surface and inner back surface of the housing, having at least one slit portion on the inner back surface of the housing in which the reflecting portion is disposed.

13. The apparatus according to claim 12, wherein the concave and convex portions combine to form a mesh pattern on the inner back surface of the housing.

14. The apparatus according to claim 12, wherein the concave and convex portions combine to form a striped pattern on the inner back surface of the housing.

15. The apparatus according to claim 12, wherein the light source has a color depending on a function of the automobile lamp.

16. The apparatus according to claim 12, wherein the light source has a cap having a color depending on a function of the automobile lamp.

17. The apparatus according to claim 12, wherein the light source comprises a bulb formed of glass including a pigment having a color depending on a function of the automobile lamp.

18. The apparatus according to claim 12, wherein the automobile lamp is formed within an automobile body having a color, and wherein the automobile lamp inner back surface color is similar to automobile body color.

19. The apparatus according to claim 12, wherein the automobile lamp is formed adjacent to an automobile bumper having a color, and wherein the automobile lamp inner back surface color is similar to the automobile bumper color.

20. The apparatus according to claim 12, the material of the inner wall is polycarbonate.

21. The apparatus according to claim 12, the inner wall is formed by painting a colored material on a surface material of a raw inner wall material.

22. The apparatus according to claim 12, wherein the slit portion is formed by punching a corresponding portion of the inner wall.

23. The apparatus according to claim 12, wherein the inner wall and the slit portion are formed through multi-injection molding during a same step in a production process.

24. The apparatus according to claim 12, wherein the lens is colored such that emitted light from the automobile lamp has a color when it passes through the lens depending on a function of the automobile lamp.

25. The apparatus according to claim 12, wherein when light emitted from the automobile lamp is white, a color of the lens is in a close range to the color limit of the color of the automobile body.

26. The apparatus according to claim 12, wherein when light emitted from the automobile lamp is white, a color of the lens is white in a close range to the color limit of the color of the bumper.

27. An automobile lamp included in an automobile combination lamp having a light source, a housing whose front portion is an aperture, and a lens covering the aperture, the automobile lamp further comprising:
   a side inner wall arranged on a side surface of the housing having a color that is visible as a uniform color of the automobile lamp when the automobile lamp is off;
   an inner front wall disposed between the light source and the lens having at least one window portion and at least one colored portion having a color that is visible as a uniform color of the automobile lamp when the automobile lamp is off; and
   a reflecting portion disposed entirely on an inner back surface of the housing.

28. The apparatus according to claim 27, wherein the colored portion and the window portion combine to form a mesh pattern on the inner front wall.

29. The apparatus according to claim 27, wherein the colored portion and the window portion combine to form a striped pattern on the inner front wall.

30. The apparatus according to claim 27, wherein the light source has a color depending on a function of the automobile lamp.

31. The apparatus according to claim 27, wherein the light source has a cap having a color depending on the function of the automobile lamp.

32. The apparatus according to claim 27, wherein the light source comprises a bulb formed of glass including a pigment having a color depending on a function of the automobile lamp.

33. The apparatus according to claim 27, wherein the inner front wall and the inner side wall are formed through multi-injection molding at a same step in a production process.

34. The apparatus according to claim 27, wherein the automobile lamp is formed within an automobile body having a color, and wherein the automobile lamp inner back surface color is similar to an automobile body color.

35. The apparatus according to claim 27, wherein the automobile lamp is formed adjacent to an automobile bumper having a color, and wherein the automobile lamp inner back surface color is similar to an automobile bumper color.

36. The apparatus according to claim 27, wherein a material of the side inner wall and the colored portion of the inner front wall is polycarbonate.

37. The apparatus according to claim 27, wherein the formation of the side inner wall and the colored portion of the inner front wall are comprised of painting a colored material on a raw surface.

38. The apparatus according to claim 27, wherein an inner back wall is arranged such that at least one reflecting portion is remaining in a predetermined pattern on the inner back surface of the housing.

39. The apparatus according to claim 38, wherein the inner back wall portion and the remaining portion combine to form a mesh pattern on the inner back surface of the housing.

40. The apparatus according to claim 38, wherein the inner back wall portion and the remaining reflecting portion combine to form a striped pattern on the inner back surface of the housing.

41. The apparatus according to claim 38, wherein the inner front wall, the side inner wall, and the inner back wall are formed through multi-injection molding at a same step a in production process.

42. The apparatus according to claim 38, wherein material of the side inner wall, the colored portion, and the inner back wall is polycarbonate.

43. The apparatus according to claim 38, wherein the formation of the inner side wall, the colored portion, and the inner back wall are comprised of painting a colored material on a surface of a raw material.

44. The apparatus according to claim 27, wherein the lens is colored such that emitted light from the automobile lamp has a color when it passes through the lens depending on a function of the automobile lamp.

45. The apparatus according to claim 27, wherein when the light emitted from the automobile lamp is white, the color of the lens is in a close range to the color limit of the color of the automobile body.

46. The apparatus according to claim 27, wherein when the light emitted from the automobile lamp is white, the color of the lens is white in a close range to the color limit of the color of the bumper.

47. An automobile rear combination lamp comprising a turn signal lamp, a back-up lamp, and a stop lamp, wherein:
the turn signal lamp further includes a light source covered with an amber cap, a first housing with a first aperture, a first lens covering the first aperture, and at least one reflecting portion arranged partially in a pattern on an inner back surface of the first housing;
the back-up lamp further includes a colorless and transparent light source, a second housing with a second aperture, a second lens covering the second aperture, and at least one reflecting portion arranged partially in a predetermined pattern on an inner back surface of the second housing;
the stop lamp further includes a colorless and transparent light source, a third housing with a third aperture, a third lens covering the third aperture, and at least one reflecting portion arranged entirely on an inner back surface of the third housing;
wherein the first lens, second lens, and third lens are composed of two or more predetermined colors such that emitted light from the turn signal lamp, the:.back-up lamp, and the stop lamp have a color depending on the function of the lamp; and
an inner side surface and the inner back surface of the housing corresponding to the turn signal lamp, the back-up lamp, and the stop lamp have a color to be perceived as a color of the automobile rear combination lamp when the lamp is off.

48. The apparatus according to claim 47, wherein the pattern of the at least one reflecting portion is mesh.

49. The apparatus according to claim 47, wherein the pattern of the at least one reflecting portion is striped.

50. The apparatus according to claim 47, wherein the light source comprises a bulb formed of glass including a pigment having a color depending on a function of the automobile lamp.

51. The apparatus according to claim 47, wherein a color of the inner side surface and the inner back surface of the housing is a color of an automobile body.

52. The apparatus according to claim 47, wherein a color of the inner side surface and the inner back surface of the housing is a color of a bumper.

53. The apparatus according to claim 47, wherein the color of the lens corresponding to the turn signal lamp and the back-up lamp is pale pink.

54. The apparatus according to claim 47, wherein a color of the lens corresponding to the turn signal lamp and the back-up lamp is white in a close range to a red color limit.

55. The apparatus according to claim 47, wherein the color of the lens corresponding to stop lamp is red.

56. The apparatus according to claim 47, wherein the lens and the housing are respectively formed through the multi-color injection molding at a same step in a production process.

57. The apparatus according to claim 1, wherein the reflecting portion is located behind the light source.

58. The apparatus according to claim 12, wherein the reflecting portion is located behind the light source.

59. A vehicle lamp capable of providing a substantially uniform color at a front of the lamp when the lamp is off, comprising:
a light source;
a housing with a front aperture;
a lens covering the aperture;
an inner back surface of the housing having color portions that are visible as a substantially uniform color of the vehicle lamp when the light source is off; and
at least one reflecting portion located behind the light source and disposed in a pattern with the color portions on the inner back surface of the housing.

* * * * *